United States Patent
Schwersenz et al.

(10) Patent No.: US 11,948,735 B2
(45) Date of Patent: Apr. 2, 2024

(54) METHOD FOR PRODUCING A PLANAR COIL ASSEMBLY AND A SENSOR HEAD PROVIDED WITH SAME

(71) Applicant: Trafag AG, Bubikon (CH)

(72) Inventors: Anatol Schwersenz, Ohringen (DE); Viktoria Riesling, Niedernhall (DE); Sebastian Schwiertz, Schwabisch Hall (DE)

(73) Assignee: Trafag AG, Bubikon (CH)

( * ) Notice: Subject to any disclaimer, the term of this patent is extended or adjusted under 35 U.S.C. 154(b) by 726 days.

(21) Appl. No.: 17/046,911

(22) PCT Filed: Apr. 10, 2019

(86) PCT No.: PCT/EP2019/059162
§ 371 (c)(1),
(2) Date: Oct. 12, 2020

(87) PCT Pub. No.: WO2019/197500
PCT Pub. Date: Oct. 17, 2019

(65) Prior Publication Data
US 2021/0383969 A1  Dec. 9, 2021

(30) Foreign Application Priority Data

Apr. 13, 2018 (DE) .......................... 102018108869.8
Jun. 20, 2018 (DE) .......................... 102018114785.6

(51) Int. Cl.
*H01F 41/04* (2006.01)
*G01L 3/10* (2006.01)

(52) U.S. Cl.
CPC .............. *H01F 41/041* (2013.01); *G01L 3/10* (2013.01); *Y10T 29/49002* (2015.01)

(58) Field of Classification Search
CPC ......... G01L 3/10; H01F 41/041; H01F 5/003; H01F 2027/2819; H01F 27/366; G01B 7/02; Y10T 29/49002
(Continued)

(56) References Cited

U.S. PATENT DOCUMENTS 9,536,647 B2 * 1/2017 Hahn ...................... H01F 5/003
2010/0194513 A1  8/2010 Ozawa et al.
(Continued)

FOREIGN PATENT DOCUMENTS

DE         110599 C     3/1925
DE     102016122172 A1  1/2018

*Primary Examiner* — Thiem D Phan
(74) *Attorney, Agent, or Firm* — United One Law Group LLC; Kongsik Kim; Jhongwoo Peck

(57) ABSTRACT

To improve the accuracy in the use of inductive components, the invention provides a method for producing a planar coil assembly (32) comprising n planar coil units (10) arranged on top of the other, wherein n is a natural number greater than 1, the method comprising:

Figure 1:
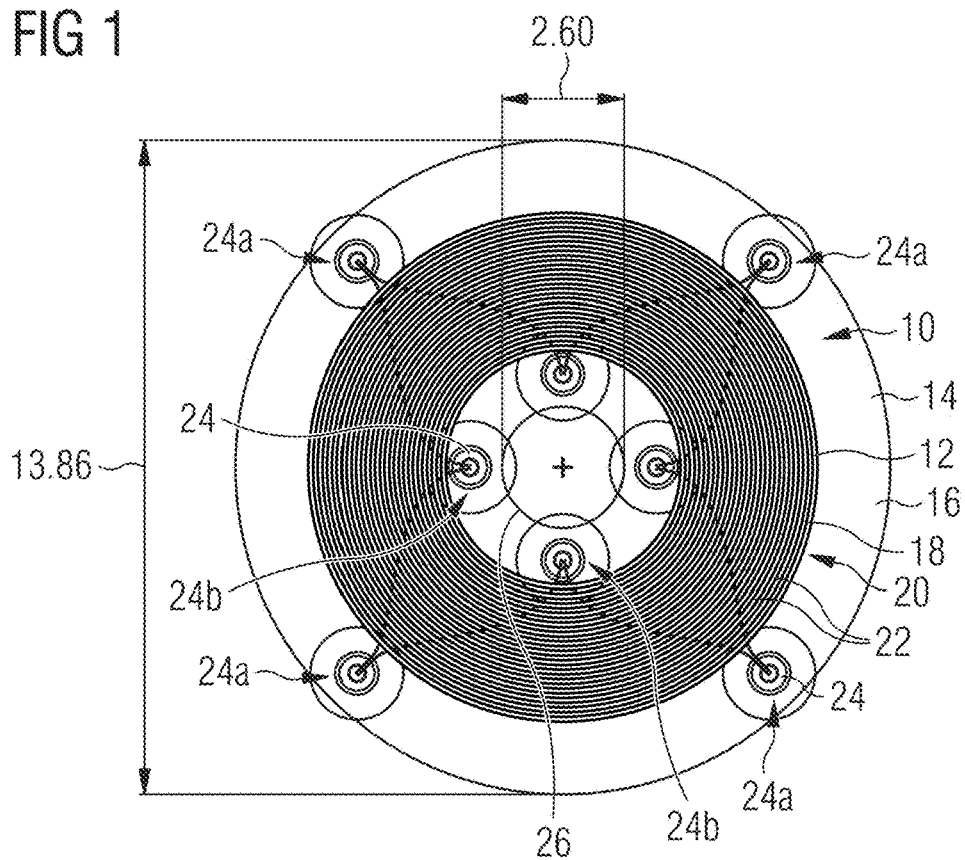

a) creating an i-th planar coil unit (10) by producing, with the aid of a computer, at least one planar coil (12) made of an electric conductor and having a planar coil thickness $d_{i,PS}$ on an insulating material layer (14) made of electric insulating material having a layer thickness $d_{i,IM}$, for i equal to 1 to n, and b) arranging the planar coil units (10) in layers, with the interposition of the insulating material layer (14) between the planar coils (12), wherein the thicknesses $d_{i,PS}$ and $d_{i,IM}$, are selected such that $$0,6 \leq \frac{D_{PS}}{D_{IM} + D_{PS}} \leq 0,9,$$

(Continued)

applies.

12 Claims, 6 Drawing Sheets

(58) Field of Classification Search
USPC ...... 29/592.1, 593, 602.1, 602.09, 825, 829, 29/603.09
See application file for complete search history.

(56) References Cited

U.S. PATENT DOCUMENTS

| | | | |
|---|---|---|---|
| 2010/0259351 A1* | 10/2010 | Bogert | H01F 5/003 336/200 |
| 2015/0302967 A1 | 10/2015 | Jenkins | |
| 2017/0365386 A1 | 12/2017 | Arai et al. | |

* cited by examiner

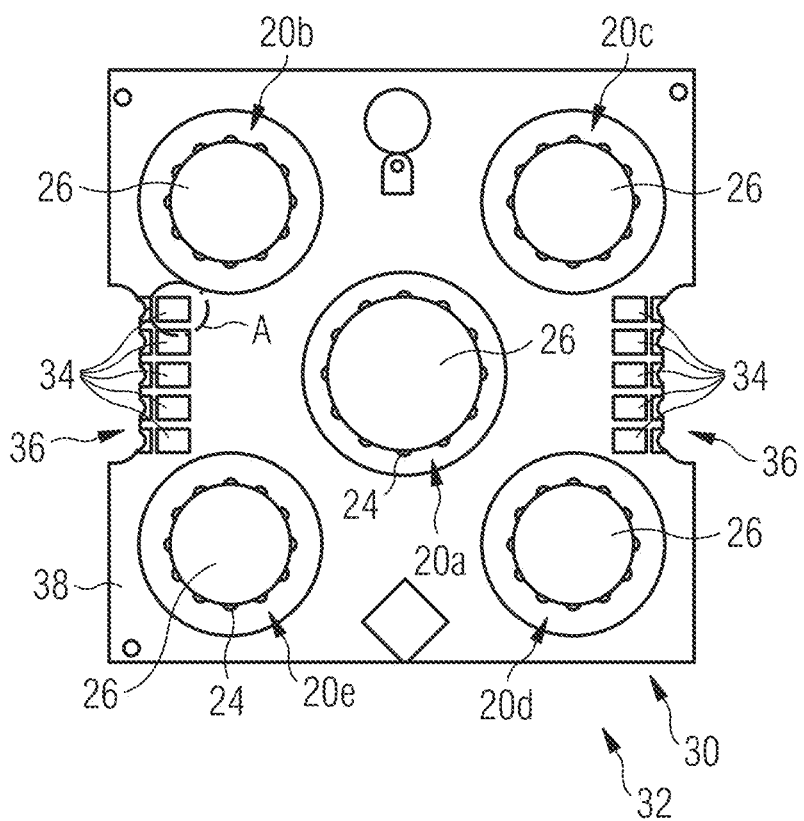

METHOD FOR PRODUCING A PLANAR COIL ASSEMBLY AND A SENSOR HEAD PROVIDED WITH SAME

CROSS-REFERENCES TO RELATED APPLICATIONS

This application is a National Stage Entry of International Application PCT/EP2019/059162 filed on Apr. 10, 2019, which claims priority from German Applications 102018114785.6 and 102018108869.8, filed on Jun. 20, 2018 and Apr. 13, 2018, respectively. The aforementioned patent applications are incorporated herein by reference in their entirety.

The invention relates to a method for producing a planar coil assembly which has several planar coil units arranged one over the other. The invention also relates to a process for producing a sensor head for a torque sensor or force sensor by carrying out the method for producing a planar coil assembly. Finally, the invention relates to a sensor head obtainable by such methods.

In particular, the invention relates to an especially advantageous production of a sensor head for a torque transducer and a torque sensor designed to measure a torque at a shaft by recording changes in the magnetic field. Such torque sensors, which detect torques in shafts on the basis of changes in the magnetic field, and the scientific basis therefor are described in the following literature:

D1 HINZ, Gerhard; VOIGT, Heinz; BOLL, R.; OBERSHOTT, K. J. (publisher): Chapter 4-Magnetoelastic sensors. In: Sensors: Magnetic Sensors. Weinheim [u. a.]: VCH-Verl.-Ges., 1989 (Sensors: A comprehensive survey; 5). Page 97-152-ISBN 3-527-26771-9
D2 U.S. Pat. No. 3,311,818 A
D3 EP 0 384 042 A2
D4 DE 30 31 997 A1
D5 U.S. Pat. No. 3,011,340 A
D6 U.S. Pat. No. 4,135,391 A
D7 DE 10 2009 008 074 A1
D8 WO 2012/152515 A1
D9 DE 85 11 143 U1

Especially a design of torque transducers as described in D4 (DE 30 31 997 A1) has proven to be particularly effective for measuring torques in shafts and other measuring points.

A particularly advantageous method for producing a sensor head for such a force sensor or torque sensor is described and shown in the following literature:
D10 WO 2018/019859.

Accordingly, a generator coil for generating a magnetic field as well as measuring coils for measuring magnetic field changes are formed by planar coils lying one above the other and connected to each other by means of vias or through-connections. Accordingly, document D10 describes a method for manufacturing a planar coil assembly comprising n superimposed planar coil units, where n is a natural number greater than 1, the method comprising the steps:
  a) creating an i-th planar coil unit by producing, with the aid of a computer, at least one planar coil made from an electric conductor and having a planar coil thickness $d_{i,PS}$ on an insulating material layer made from electric insulating material and having a layer thickness $d_{i,IM}$, for i equal to 1 to n, and
  b) arranging the planar coil units in layers, with the interposition of the insulating material layer between the planar coils.

Methods for producing planar coil arrangements are also known from the following literature:

D11 EP 2 107 577 A1
D12 WO 2010/065113 A1
D13 WO 2011/138232 A1

A particularly preferred embodiment of the invention provides the usage of flexible printed circuit boards and their application. For relevant literature, reference is made to
D14 WO 2011/152994 A1

The invention is based on the problem of improving a method for producing a planar coil assembly for use in sensor heads of torque sensors or force sensors in such a way that more accurate measurements are possible with cost-effective production.

The invention solves this problem by providing a method comprising the steps of claim 1. According to a further aspect, the invention provides a method for producing a sensor head using the planar coil assembly production method according the further independent claim. The invention also provides a sensor head obtainable by such a sensor head production method.

Advantageous designs are the subject of the subclaims.

According to one aspect, the invention provides a method for producing a planar coil assembly comprising n superimposed planar coil units, wherein n is a natural number greater than 1, the method comprising:
  a) creating an i-th planar coil unit by producing, with the aid of a computer, at least one planar coil made from an electric conductor and having a planar coil thickness $d_{i,PS}$ on an insulating material layer made from electric insulating material having a layer thickness $d_{i,IM}$, for i equal to 1 to n, and
  b) arranging the planar coil units in layers, with the interposition of the insulating material layer between the planar coils, wherein the thicknesses $d_{i,PS}$ and $d_{i,IM}$ are selected such that $$0,6 \leq \frac{D_{PS}}{D_{IM}+D_{PS}} \leq 0,9,$$

applies, where $$D_{PS} = \left| \sum_{i=1}^{n} d_{i,PS} \right|$$

is the sum of the thicknesses $d_{i,PS}$ of the planar coils and $$D_{IM} = \left| \sum_{i=1}^{n} d_{i,IM} \right|$$

is the sum of the thicknesses of the insulating material layers.

In other words, 60 to 90% of the total thickness of the at least one coil formed by the individual planar coils are formed by the electrical conductor material and, accordingly, only 40 to 10% of the total thickness are formed by the insulating material.

Preferably, the method comprises electrically connecting superimposed planar coils of the planar coil units to form at least one magnetic coil.

It is preferred that in step b) only one single insulating material layer having the thickness $d_{i,IM}$ is arranged between each planar coil.

It is preferred that step a) comprises the step:
a1) computer-aided production of several planar coils lying in one plane per planar coil unit.

It is preferred that step a) comprises the step:
a2) symmetrical computer-aided production of several planar coils lying in one plane per planar coil unit.

It is preferred that step a) comprises the step:
a3) computer-aided production of planar coils of different planar coil units symmetrical to each other.

It is preferred that step a) comprise the step:
a4) symmetrically creating planar coils of a planar coil unit and the planar coils of several planar coil units by the computer-aided production;

It is preferred that step a) comprises the step:
a5) carrying out the computer-aided production by producing the at least one planar coil lithographically.

It is preferred that step a) comprises the step:
a6) computer-aided production of the at least one planar coil per planar coil unit on an insulating material layer selected from the group of insulating materials comprising a printed circuit board base material, a prepreg layer, and a synthetic material.

It is preferred that step a) comprises the step:
a7) producing the at least one planar coil having several coil tracks that are separated from each other.

It is preferred that step a) comprises the step:
a8) producing a central generator planar coil and at least a first, a second, and a third measuring planar coil per planar coil unit in a point-symmetrical arrangement to each other.

It is preferred that step a) comprises the step:
a9) producing a central generator planar coil and at least a first, a second, a third, and a fourth measuring planar coil per planar coil unit in an axis-symmetrical or point-symmetrical arrangement to each other.

A particularly preferred embodiment of the method is characterized by
d) creating at least one through-opening through a center of superimposed planar coils of the planar coil units.

Preferably, the method comprises the step:
Electrically connecting superimposed planar coils by means of at least one through-connection at the at least one through-opening.

Preferably, the method comprises the step:
Inserting a flux concentrator into the at least one through-opening.

Preferably, the method comprises the step:
Performing step d) in such a way that the insulating material layers are provided with the respective region of the through-opening before step a) and/or before step b) or after step b).

According to a further aspect, the invention provides a method for producing a sensor head for a torque or force sensor, which sensor head comprises a generator coil for generating a magnetic field and at least a first and a second measuring coil for measuring a change in a magnetic field induced in a measuring body, the method comprising carrying out the method according to any of the above embodiments for producing the generator coil and the measuring coils.

The invention further provides a sensor head obtainable by such a sensor head production method.

Preferred designs of the invention provide improved methods for producing planar coil assemblies. Particularly preferably, a new PCB coil technology is used. "PCB" is the abbreviation of "printed circuit board". Accordingly, there is especially provided a method for producing the coils using the printed circuit board technology.

Preferably, the planar coils are produced on a flexible printed circuit board.

Preferably, several planar coils are produced jointly on one plane of a flexible printed circuit board.

A general idea is to produce the coils by computer-aided production. Computer-aided production refers to production processes in which production is carried out directly using CAD data. Particularly preferably, lithographical processes are used for this purpose in which patterns obtainable from CAD data are exposed on a substrate, like in particular a printed circuit board substrate, and thus layers are selectively applied or removed.

By computer-aided production, the planar coils can be produced in large series with the same quality and exactly the same design. This has in particular the advantages explained in more detail below when simultaneously using several such coils, as they are to be used in particular in the sensor heads according to the above-mentioned literature D1-D10.

One method for producing planar coil assemblies in printed circuit board technology, as known from D10 or D11, for example, involves arranging the individual planar coils one above the other in the manner of folding coils. For this purpose, the coils are produced on a flexible printed circuit board which is then folded to arrange the planar coils on top of each other. As a result, there are at least two layers of insulating material made of PCB base material between each of the planar coils.

In contrast, the invention provides that the ratio of the thicknesses of the electrically conductive material forming planar coils and the thicknesses of the insulating material inserted therebetween is predetermined as defined in claim 1. In this manner, significantly more electrically conductive material than insulating material is provided in the region of the superimposed planar coils. As a result, a particularly high magnetic power can be generated in a very small space. This is enabled in particular by computer-aided production, whereby the arrangement of the conductive material and the insulating material can be predetermined in a highly reproducible manner.

In a particularly preferred embodiment, this is achieved in such a way that there is only one layer of insulating material between each of the planar coils. For example, an electrical insulating material based on a prepreg is inserted as the insulating material.

In a particularly preferred approach, several planar coils per layer are produced simultaneously in one plane and then the layers are arranged one on top of the other to form the planar coil assembly. In particular, in this manner, a first planar coil intended to form a layer of a generator coil, a second planar coil intended to form a layer of a first measuring coil, and a third planar coil intended to form a layer of a second measuring coil are produced simultaneously. Preferably, three, four or five planar coils per plane are produced in order to create the different concepts of sensor heads using PCB coil technology, which concepts are explained in more detail in the literature D1-D10. The planar coil units of the different coils are thus textured and positioned jointly in one process. The manufacturing process implies that a coil support and a mechanical, highly precise holder are formed in one piece.

Preferably, the process comprises the step:
Symmetrical design using planar coils by means of lithography.

As a result of the computer-aided production, especially lithography, there are hardly any breaks in symmetry by design. For example, symmetrically constructed planar coils or planar coil packs can be interconnected to form a perfectly balanced bridge circuit. In particular, symmetrically designed planar coil units placed one on top of the other can be interconnected to form an H-bridge circuit. In this way, a very well balanced bridge circuit can be built, which allows very precise measurements of even smaller signals. Manually wound coils or coils that are placed individually may show differences in symmetry that are due to manufacturing tolerances and lead to an unbalanced bridge.

Preferably, through-connections within the coils (especially within spirally arranged tracks of planar coils) are provided in order to connect the individual superimposed planar coils in order to form a complete coil. By using through-connections also within the coil, so-called buried vias can be avoided, whereby high production costs for planar coils are avoided.

The idea of a through-connection at apertures or through-openings is a separate invention and is claimed even without the thickness specifications given in claim 1.

Preferably, an assembly as described as the preferred embodiment in document D10 is provided. According to this, at least one generator coil is centrally provided, around which several measuring coils are arranged in a star shape. Preferably, a point-symmetrical assembly of the coil or coils around the generator is provided. In one embodiment, the sensor head is point-symmetrical with regard to the coil arrangement.

The use of only one interlayer (e.g. prepreg) between the inner layer cores is particularly preferred in order to produce a planar coil that is as thin and compact as possible.

Preferably, the inner layer core has a layer of insulating material with a thickness in the order of about 40 μm and has layers of conductive material, such as especially copper, which are lithographically exposed and textured, on its top and bottom sides.

After the lithographic treatment, the inner layer cores are preferably stacked in a registered manner, with a prepreg interlayer as an insulator between them.

Thus layers of planar coil units arranged one above the other are produced which are laminated together in a vacuum press.

After lamination in the vacuum press, the interlayers preferably have a thickness of 30 μm and 70 μm and preferably in the range of about 50 μm.

In a particularly preferred design, contact pads and contacts are created with non-ferromagnetic materials. In particular, the contacts, contact pads and connections, such as in particular soldered connections or the like, are designed to be nickel-free.

Preferably, no nickel is used in the design, since nickel is magnetic and can therefore direct the fields in an asymmetrical manner. In the usual electrical contacting of sensors, nickel is normally applied to the pads (e.g. in the Cu—Ni—Au arrangement) to make the connections stable in the long term against corrosion. This is not done in the preferred embodiment of the invention; the coils are rather contacted using non-magnetic materials.

Preferably, around the coil windings, the sensor head merely has interrupted conductor paths or conductor areas. For example, copper areas around the coils are interrupted. Interrupted copper lines around the coil windings have the advantage that eddy currents around the coils are avoided. Preferably, there are therefore no closed conductor paths around the coils to minimize eddy current losses.

In the following, preferred embodiments of the invention and their advantages are explained in more detail.

The invention relates in particular to the production of inductive components. Inductive components are characterized by developing a magnetic field. These inductors are preferably used specifically as sensors and actuators.

The change in the magnetic environment is preferably recorded by the sensors.

Preferably, when used in actuators, a change in the magnetic environment is induced.

In one form of a possible use of the invention, even both applications can come into effect in one system. Preferably, the change in the magnetic transfer path is evaluated in this case.

The magnetic field is created by the current impressed in conductor loops. In previous sensor heads, the conductor loops are formed by wound wire, for example. In the invention, the conductor loops are formed planar, preferably in printed circuit boards, on several layers in order to achieve the appropriate number of turns for a desired magnetic field to be created.

The advantage of a computer-aided production is the definition of the coils given by data, and the associated repeatability in the overall performance. For example, the planar coils are constructed using printed circuit board technology. Advantageously, the lithographic definition of the coils gives the repeatability in the overall performance. In addition, products manufactured using the printed circuit board technology can be produced with very good scalability in volume.

Preferably, different special features are provided in the design of the coils using printed circuit board technology, which features improve the overall performance in terms of application and manufacturability.

In a preferred design of the coils formed by planar coils placed one on top of the other, magnetically conductive materials are used to strengthen the magnetic fields. For example, ferrites are inserted into the coils. These are typically passed through the coils.

For this purpose, through-openings are preferably provided in the coils.

On the other hand, larger areas are required for the through-connections when the coils are designed in printed circuit board technology. This means that the space available for the windings is small; in other words, the through-connections and possibly the magnetically conductive materials to be passed through them to strengthen the magnetic fields lead to a significant restriction in the winding window provided for the place of the windings, in top view.

In one embodiment, the through-connections are offset at the opening for the magnetically conductive materials to be used to strengthen the magnetic fields. The through-connections preferably run along the wall of through-openings for the magnetically conductive materials. This allows a significant reduction of the required footprint.

In particularly preferred embodiments, special symmetry properties are provided in the design of a coil. These can be achieved particularly easily by the parallel computer-aided production of several planar coils.

For coils in a sensor application or an actuator application, the interconnection of the coils to form a system is often in the foreground. In this case, a particularly high degree of symmetry properties of coils is advantageous. Especially for differential measurement applications, the symmetry of the measurement signal in relation to the measurement application is in the foreground. In this case, the symmetry of the measurement effect can be influenced in advance by mapping the coil geometry in the design data.

A particularly preferred embodiment of the invention thus provides for the step:

Designing coils by means of a CAD data processing system in dependence on a predetermined symmetry of the measuring effect.

Since a planar coil also has a depth, the mirror symmetry, point symmetry and axis symmetry can be influenced in this case.

Thus a preferred embodiment of the method comprises the step: Selection of at least one form of mirror symmetry, point symmetry and axis symmetry in the design of the planar coils.

According to the invention, such symmetries can be achieved in a process-reliable manner by the coils which are produced by applying the data-based method.

With the symmetry that is achieved, the output signals are also held in a very narrow band. This is often the only way to enable differential execution methods for many applications. The planar coils can each have a more monofilament structure. By manufacturing the planar coils and mapping the coil geometry in corresponding manufacturing data, such as lithographic manufacturing data, design freedom for bifilar coils and also for coils with multiple filarities can be achieved. For example, bifilar coils or coils with multiple filarities can be used to build differential sensors. For example, several differential sensors can be used as multiple filar coils to the generator.

Furthermore, by nesting the winding direction in the coil stack, a magnetic residuum can be formed, which for example reacts with extreme sensor output signals at a small magnetic change. This leads to sensors that can be used as distance sensors or as material sensors without a noticeable field propagated to the outside.

This measurement can also be supported by a magnetic reference target on the side facing away from the measuring object.

In a particularly preferred embodiment, outer surface elements are sectorized outside a coil arrangement or around a planar coil so that no closed conductor loop is formed around the respective coil or its area. The advantages of such designs are explained in more detail below.

Magnetic fields are induced by coils. The field lines characteristically run vertically from the center of the coil and are closed around the outside. This means that even external surface elements are magnetically flooded. When alternating magnetic fields are used, eddy currents can occur in the adjacent electrically conductive areas which create their own magnetic fields which oppose the actual magnetic field.

This effect can be counteracted by suitably sectorizing the external surface elements. Strong sectorizing (multiple interruption, for example to form more than two, more than five, more than eight, more than ten sectors) allows high frequencies in the magnetic field. In contrast, closed surface elements dampen the higher-frequency behavior.

If a particularly preferred embodiment, all materials used in the vicinity of the coils are selected for their magnetic behavior in order to be used as sensor coils. In particular, electrical conductor materials for contacting are selected so that they are not ferromagnetic. For example, the use of nickel-gold as a soldering surface is often not recommended, since a ferritic foil can be produced by an amorphous formation of the nickel in the deposition process. This leads to an unexpected remanence and thus to a hysteresis in the measurement signal. Such a hysteresis can be reduced or avoided by consistently reducing or avoiding ferromagnetic materials as contact or connecting materials.

By suitably designing the connections on the PCB-produced coil component, it is also possible to do without additional pins or contacts or plug/socket systems. For example, direct contacting pads are provided on a printed circuit board element. Such contacting pads can be provided at an edge, e.g. right-angled in this case, or at a plane, especially on one of the main planes or on one of the planes of the front edges. In one embodiment, such contact pads are provided within a recess in a main edge of the printed circuit board element.

By making the connections directly on the PCB-produced coil component, it is also possible to dispense with additional pins or contacts or other plug/socket systems. This not only leads to a reduction of the total number of components, but also increases the overall system life, since the unused component cannot fail either.

In a preferred design, an additional test pad for electrical and functional testing is provided on a connection path by an additional area delimitation, which test pad has not experienced the placement of a test contact in a soldering portion.

Figure 2:
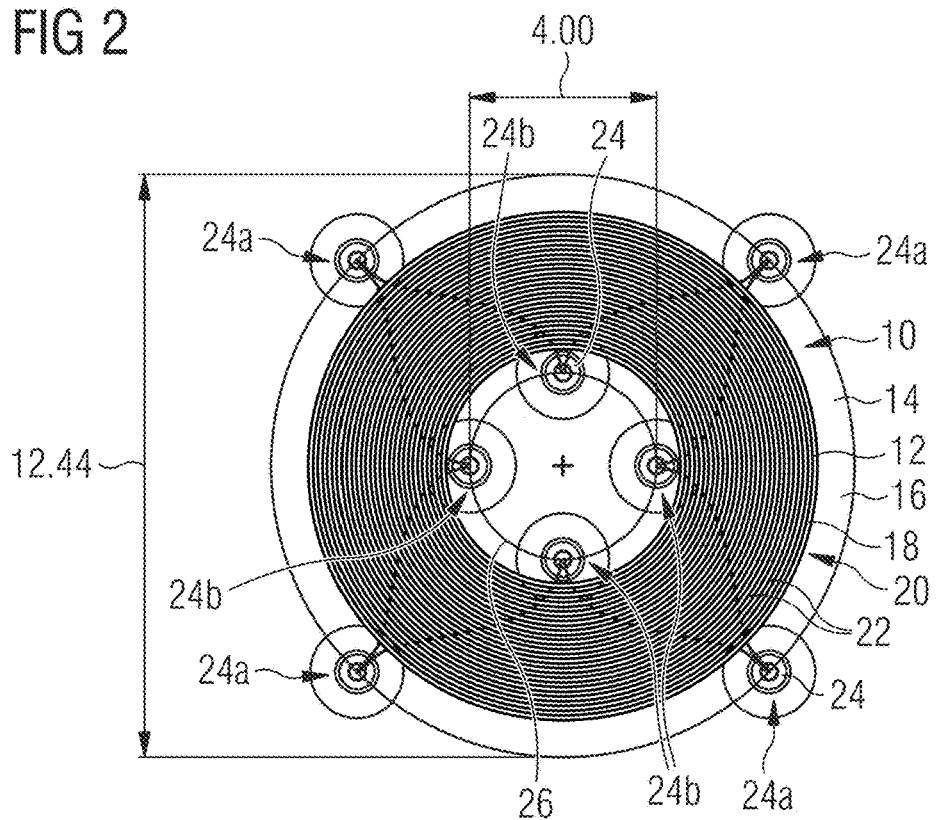
Figure 3:
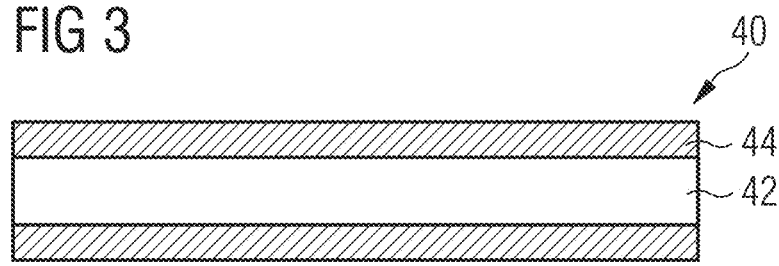
Figure 4:
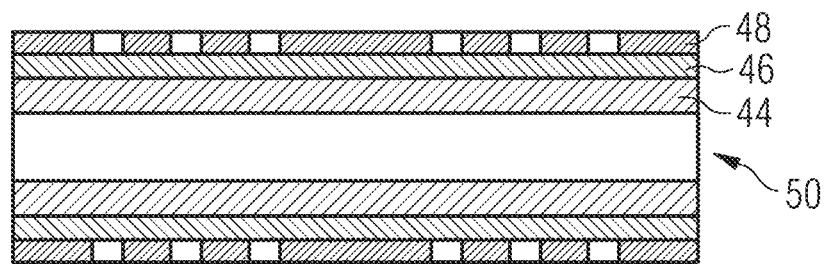
Figure 5:
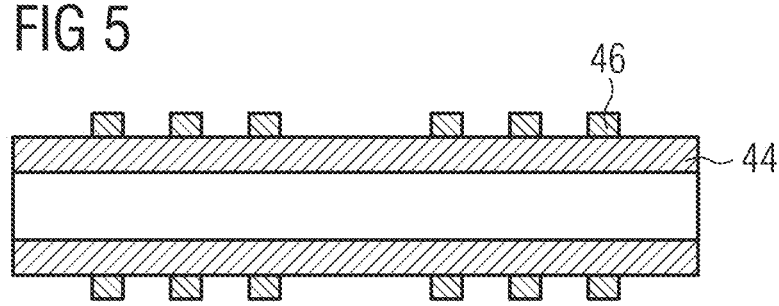
Figure 6:
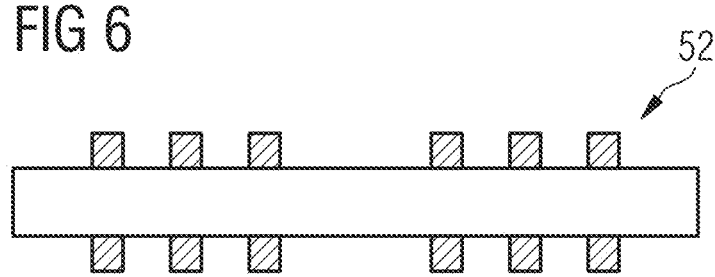
Figure 7:
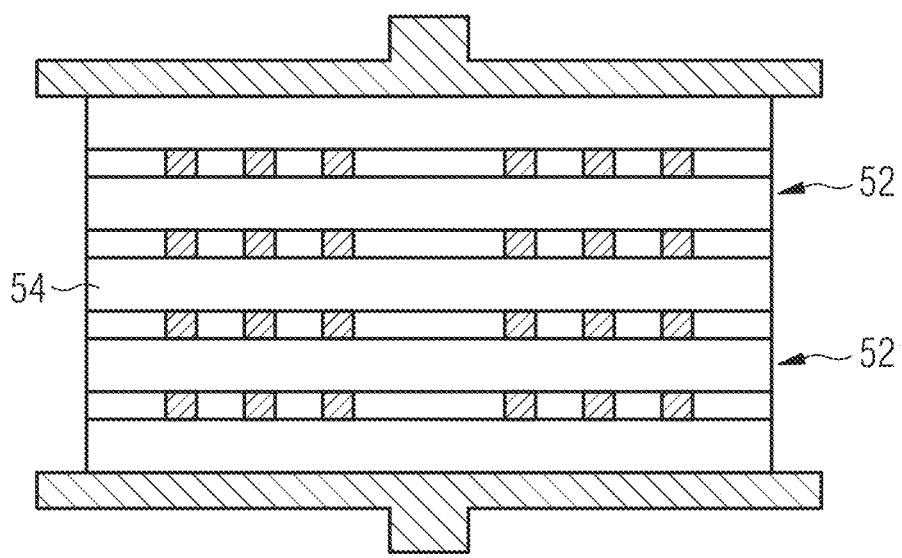
Figure 8:
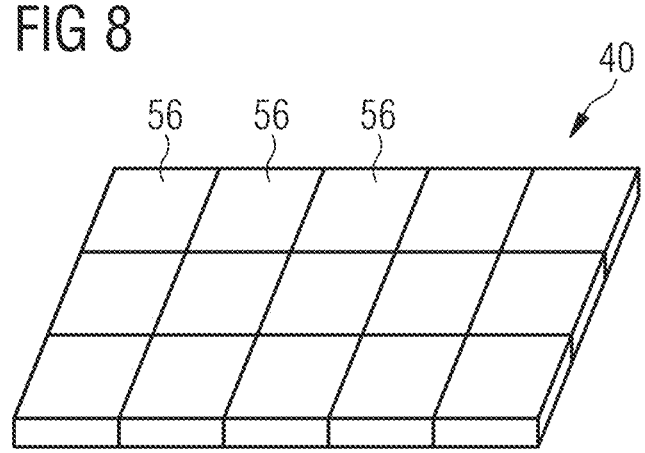
Figure 9:
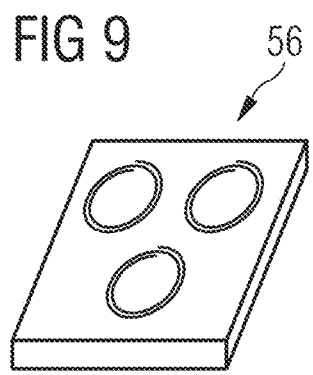
Figure 10:
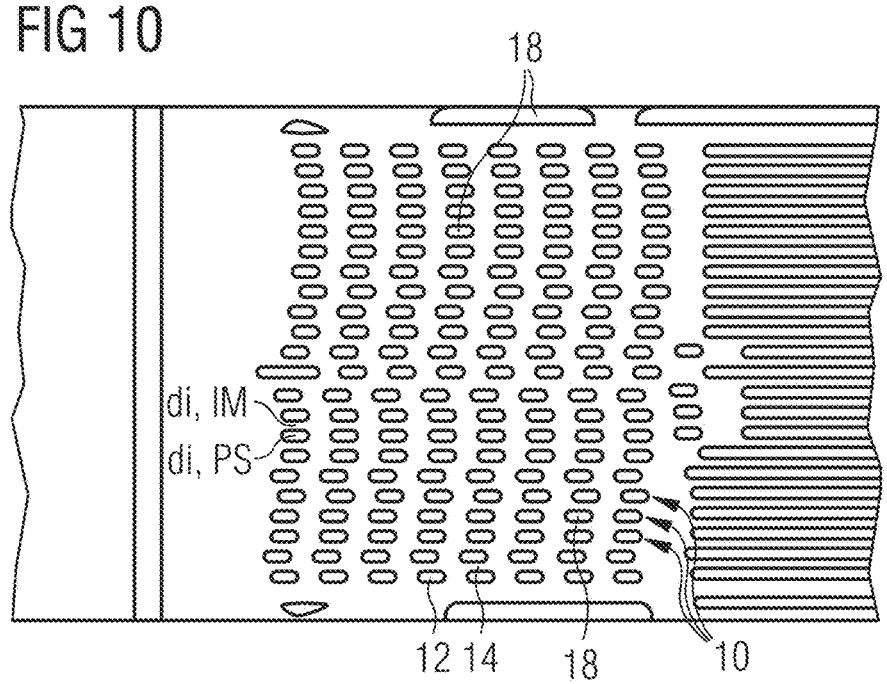
Figure 12:
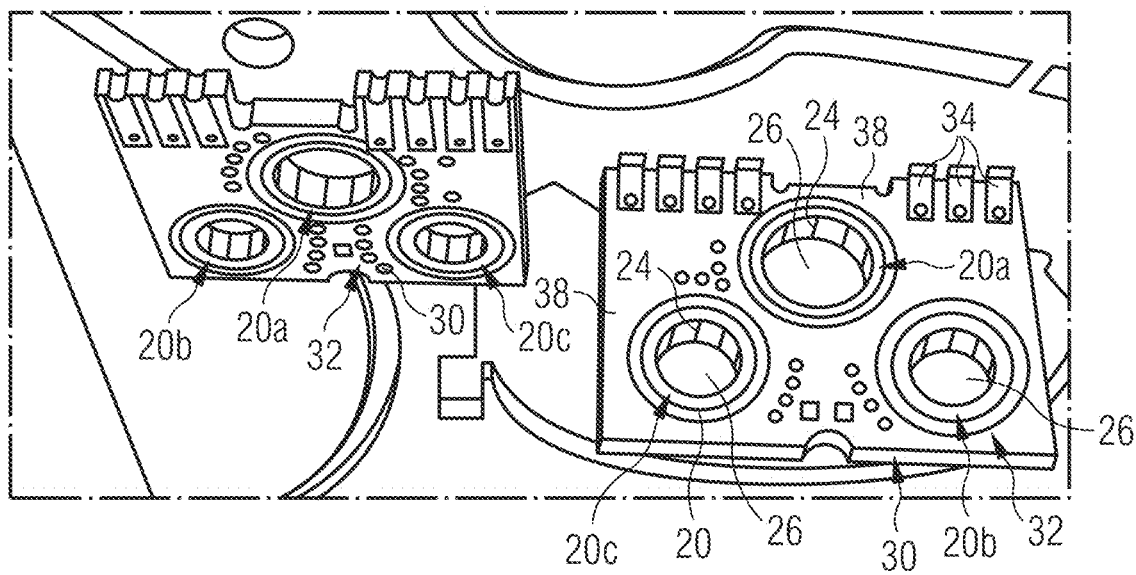
Figure 13:
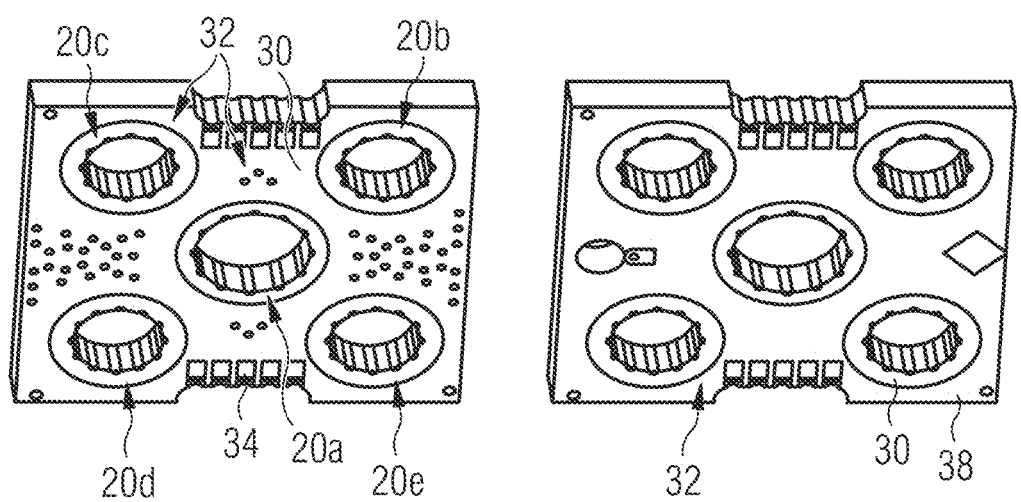

One exemplary embodiment is explained in more detail below with reference to the attached drawings wherein it is shown by:

FIG. 1 a CAD printout for a planar coil to form a planar coil pack consisting of several planar coils arranged one above the other, the locations for through-connections being shown as well;

FIG. 2 a CAD printout as in FIG. 1 for another, particularly preferred embodiment;

FIG. 3 a schematic representation of an inner layer core;

FIG. 4 a schematic representation of an inner layer core treated in a first step of a lithographic process;

FIG. 5 a schematic representation of an inner layer core treated in a second step of a lithographic process;

FIG. 6 a schematic representation of an inner layer core treated according to a lithographic process;

FIG. 7 a schematic representation of a further process step for the production of a coil;

FIG. 8 a schematic representation of an inner layer core consisting of a plurality of elements;

FIG. 9 a schematic representation of an element of the inner layer core;

FIG. 10 a photograph of a section through a planar coil pack;

FIG. 11a-11d different embodiments for CAD printouts of monofilar and multi-filar planar coils;

FIG. 12 a photograph showing inductive components for forming a sensor head for a force sensor or a torque sensor from different sides, wherein the inductive component comprises a planar coil assembly with several planar coil units arranged one on top of the other;

FIG. 13 a photograph of an inductive component from above and from below for a sensor head of a force sensor or a torque sensor according to a further embodiment; and FIG. 14 an enlarged representation from FIG. 6.

In the following, different embodiments of methods for producing a planar coil assembly 32 with planar coil units 10 arranged one on top of the other are explained in detail with reference to the illustrations in FIGS. 1-7. In this method, several planar coil units 10 are produced in which at least one planar coil 12 or preferably several planar coils 12 are produced jointly on one plane on an insulating material layer 14 by a computer-aided production.

In a particularly preferred configuration of the invention, lithographic processes are used for the computer-aided production where surfaces of a substrate, in particular of a flexible printed circuit board 16, are exposed according to patterns generated from CAD data. Exposed or unexposed areas are then etched away to form the planar coil 12 as a pattern of an electrical conductor on the insulating material layer 14 of the flexible printed circuit board 16.

Preferably, several planar coils 12 are simultaneously created on a common, preferably flexible printed circuit board 16. By superimposing the planar coil units 10 formed in this way, preferably by machine and also with the aid of CAD, the respective planar coils 12 are precisely positioned one above the other with the aid of a computer in order to form coils 20 that are each formed from several superimposed planar coils 12, the windings 22 of the superimposed planar coils 12 being connected to each other by means of through-connections 24.

FIG. 1 shows a first exemplary embodiment of a printout from a CAD file showing the design of one of the planar coils 12 and the arrangement of through-connections 24 on an insulating material layer 14.

To strengthen the magnetic field of the coil 20, a magnetic flux concentrator (not shown) made of a ferromagnetic material is to be inserted inside the coil 20. Thus, a through-opening 26 is provided inside the coil 20 to accommodate the ferromagnetic material.

In the embodiment shown in FIG. 1, outer through-connections 24a are provided outside the coil 20 and inner through-connections 24b are provided inside the coil 20. The through-opening 26 is provided inside the ring portion where the inner through-connections 24b are located. The area on which the turns 22 for the planar coils 12 can be placed is located between the ring portion where the outer through-connections 24a are arranged and the inner ring portion where the inner through-connections 24b are arranged. The turns 22 are optimally arranged on the remaining intermediate area by the computer-aided production so that a minimum distance remains between the individual turns 22 and the area is optimally covered with the material from the electrical conductor 18.

FIG. 2 is a view similar to FIG. 1 and shows an embodiment of the planar coil 12 which is preferred to the embodiment shown in FIG. 1.

In the embodiment shown in FIG. 2, at least the inner through-connection 24b is not provided in a ring portion between the through-opening 26 and the planar coil 12, but directly at the edge of the through-opening 26. The inner through-connection 24b thus runs on the inside of the through-opening 26.

Alternatively or additionally it is provided that the outer through-connection 24a is not provided within an area of an outer ring portion around the planar coil 12, but on the outer side of the insulating material layer 14.

As a result, the area which can be used for the turns 22 of the planar coils 12 is considerably larger than in the design of FIG. 1. In addition, the diameter of the through-opening can be significantly increased compared to the design of FIG. 2, without increasing the total area of the planar coil 12. This allows a larger amount of ferromagnetic material to be arranged within coil 20.

In one embodiment of the method, the individual planar coil units 10, which each have a layer of insulating material 14 and at least one or more planar coils 12 arranged thereon, in particular planar coils according to the design in FIG. 2, are placed on top of each other under computer control based on CAD data and with exact positioning. This is done in such a way that between each planar coil 12 there is only a single layer of insulating material 14, for example formed from a prepreg.

The lithographic process is illustrated in FIGS. 3 to 6. An inner layer core 40 is lithographically treated. The inner layer core 40 usually consists of an inner layer 42 of epoxy resin and glass fabric. On the top and bottom of the inner layer core 40, there is a layer of conductor material 44.

In the first step of the lithographic process, as shown in FIG. 4, a photosensitive film 46 and the photo element 48 are applied on both sides to the exposure element 50.

Thereafter, the exposure element 50 is exposed. During this process, the photosensitive film 46 is cured in the exposed areas, while the unexposed areas of the photosensitive film 46 remain uncured.

After the exposure, the photo element 48 and the unexposed areas of the photosensitive film 46 are removed as shown in FIG. 5.

In the following etching process, the exposed conductor material 44 is usually finally etched off using an alkaline solution, and the remaining cured photosensitive film 46 is removed. A structure 52 remains, which contains the layer 42 of epoxy resin and glass fabric with a pattern of conductor material 44 on top of it, as shown in FIG. 6.

In FIG. 7, several of these structures 52, in the present case two and preferably 3 to 15, are now stacked. A prepreg interlayer 54 is applied between the structures 52. The structures 52 stacked in this way are finally pressed together in a press. In this way, a number of layers of insulating material and conductor material are produced alternately. Usually, a plurality of elements 56 are produced on a common inner layer core 40, as indicated in FIG. 3-8. This allows volume production up to large quantities.

After the large-area lithographic treatment, an inner layer core 40 is cut into the individual elements 56. In the individual elements 56, usually several, preferably three or five coils 20 are arranged, as indicated in FIG. 9.

FIG. 10 shows a photograph of a section through a coil 20, wherein the coil 20 has been produced according to one embodiment of the inventive method. The center of the coil with the through-opening 26 is shown on the left, and the individual planar coils 12 with insulating material can be seen in between. This pack of superimposed planar coils 12 is, for example, arranged within an opening in a printed circuit board—rigid printed circuit board element 38—serving as a carrier substrate. The production can take place according to the process described herein. As can be seen in FIG. 10, layers of planar coil units are produced as a result, which are arranged in layers one above the other. Between each of the individual planar coil units formed from the electrical conductor 18, a layer of insulating material is provided having a thickness of 40-50 µm, for example.

The invention provides for a constant exact symmetry of the individual planar coils 12 to each other and also for the possibility of a much thinner insulating material layer therebetween by means of a computer-aided production of the planar coils 12 in always exactly the same way and/or by means of a computer-aided arrangement of the planar coils on top of each other which can be achieved either by stacking and positioning of the planar coil units 10 or by a production of the planar coil units 10 in layers one above the other.

The planar coil thickness $d_{i,PS}$ from the electrical conductor 18 of the i-th planar coil unit 10 of n superimposed planar coil units 10 and the layer thickness $d_{i,IM}$ of the insulating material layer 14 of the i-th planar coil unit 10 are selected in such a way that preferably the planar coil thickness $D_{i,PS}$ is greater than or equal to the layer thickness $d_{i,IM}$. In any case, thicknesses $D_{i,PS}$ and $d_{i,IM}$ are selected such that $$0,6 \le \frac{D_{PS}}{D_{IM} + D_{PS}} \le 0,9,$$

applies where $D_{PS} = |\Sigma_{i=1}{}^n d_{i,PS}$ is the sum of the thicknesses $D_{i,PS}$ of the planar coils and $D_{IM} = |\Sigma_{i=1}{}^n d_{i,IM}$ is the sum of the thicknesses of the insulating material layers.

This results in a proportion of material of the electrical conductor 18 (e.g. copper) on the area on which the turns 22 of the planar coils 12 are located which, viewed over the entire coil pack, is larger compared to the insulating material of the insulating material layer 14. This means that a larger current density and thus a stronger magnetic field can be generated on a smaller volume with the same current imparted on the coil 20.

Figure 11A:
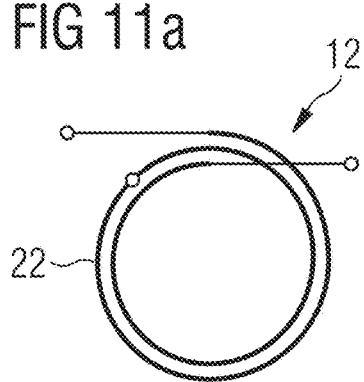
Figure 11B:
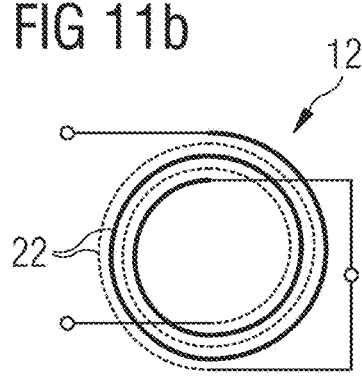
Figure 11C:
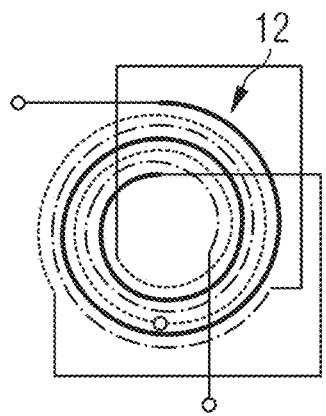
Figure 11D:
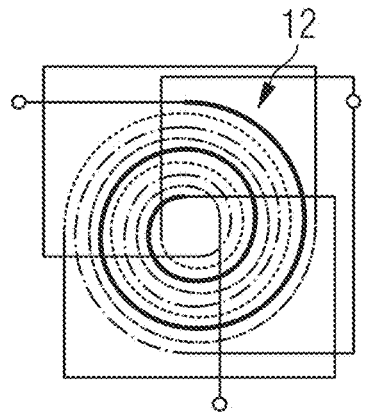

The computer-aided production of the coils 20 also offers the possibility of producing the individual planar coils 20 both in a monofilar manner, as shown in FIG. 11*a*, and with several filarities, as shown in FIG. 11*b*-11*d*.

In this way, planar coils 12 can be produced having one winding spiral or several winding spirals that are electrically insulated from each other and can be interconnected in different ways.

This allows the production of concentrically arranged coils 20*a*, 20*b*, which can be contacted differently. For example, the different filarities of a multifilar coil 20 are used for differential measurement. In another exemplary embodiment, one of the nested coils 20*a* can be used as generator coil and the other as measuring coil. In yet another exemplary embodiment, several nested coils can be used for differential measurement. In yet another configuration, the different nested coils can be used as different elements of a bridge circuit.

FIG. 12 shows a first exemplary embodiment of an inductive component 30, which has a planar coil arrangement 32 produced according to the previously explained method to form a first coil 20*a*, a second coil 20*b*, and a third coil 20*c*.

The inductive component 30 can be used as part of an actuator or a sensor. In particular, the inductive component 30 can be used as an essential part of a sensor head for a torque sensor or force sensor of the type described in the literature D1-D10. The sensor head then still comprises the ferromagnetic reinforcement material. For further details concerning the design of the sensor head, reference is made to D10.

When used for a sensor head, the first coil 20*a* can be used, for example, as a generator coil for generating a magnetic field in an element to be measured with respect to an application of force, such as a rotating shaft, while the second coil 20*b* serves as a first measuring coil and the third coil 20*c* as a second measuring coil for measuring a change in a magnetic field, in particular a change in the direction of a magnetic field under the influence of a force.

As can be seen in FIG. 12, each of the coils 20*a*, 20*b*, 20*c*, which are each formed by planar coils 12 placed one on top of the other, is provided with a through-opening 26 through which a material for magnetic amplification can be passed. Furthermore, several through-connections 24, 24*b* are provided on the inner wall of each through-opening 26. Further Embodiments of the inductive component 30 are shown in FIGS. 13 and 14, where a fourth coil 20*d* and a fifth coil 20*e* are provided in addition to the first coil 20*a*, the second coil 20*b* and the third coil 20*c*. The second to fifth coils 20*b* to 20*e* are distributed around the first coil 20*a*. The fourth coil 20*d* can form a third measuring coil and the fifth coil 20*e* can form a fourth measuring coil.

The interconnection of the measuring coils—e.g. second coil 20*b* to fifth coil 20*e*—can be done as described and shown in detail in German patent application DE 10 2017 112 913.8, which is expressly referred to for further details.

In particular, the measuring coils in this case are arranged in a so-called X-arrangement around the first coil 20*a* which acts as a generator coil.

Contact pads 34*b* for the electrical connection of the individual coils 20 and/or any other electronic components provided in the inductive components 30 are preferably arranged on at least one outer edge of the inductive component 30.

In the exemplary embodiment shown in FIG. 12, contact pads are arranged on one side.

In the exemplary embodiment of the inductive component 30 shown in FIGS. 13 and 14, the contact pads 34 are provided on opposite sides within a rectangular recess 36 of the inductive component 30. As indicated by detail A, one of the contact pads can be designed as a test pad.

A preferred embodiment of a method for producing the inductive component 30 to be used for a sensor head according to FIGS. 12 and 13 provides that cavities for the individual coils 20, 20*a*-20*e* are formed in a rigid printed circuit board element 38, as is known from the basic principle described in D11.

The individual planar coils 12, which form the individual layers of the coils 20*a*-20*e*, are jointly formed as a planar coil unit 10 on the flexible printed circuit board 16 as explained above, and the n planar coil units 10 with the respective planar coils 12 are arranged one above the other under computer control or are produced one above the other under computer control. Thus a planar coil assembly 32 is formed which has the coils 20, 20*a*-20*e* formed from individual planar coils 12 placed one above the other.

In one embodiment of the invention, the individual coils are jointly cut out by means of a cutting punch and transferred into individual cavities of the rigid printed circuit board element 38.

In another embodiment of the invention, the planar coil arrangement 32, which is formed by arranging the planar coil units 10 one on top of the other in layers, is used as inductive component 30 so that no rigid printed circuit board element 38 is required.

As shown in FIGS. 1 and 2, the coils 20 can be produced from a total of 4-100, e.g. 15, turns per planar coil 12 using e.g. n=8 layers on top of each other. Preferably, n is in the range of 3-15.

If through-connections are used in ring portions which are inside and outside the area of the windings, as shown in FIG. 1, the amount of copper in relation to the contour can be set to typically 0.3 mm, for example.

If the through-connections are included in the contour, as shown in FIG. 2, the surface usage share is considerably improved by the windings 22.

LIST OF REFERENCE SIGNS

10 planar coil unit
12 planar coil
14 insulating material layer
16 flexible printed circuit board
18 electrical conductor
20 coil 20a first coil
20b second coil
20c third coil
20d fourth coil
20e fifth coil
22 winding
24 through-connection
24a outer through-connection
24b inner through-connection
26 through-opening
30 inductive component
32 planar coil arrangement
34 contact pad
36 recess
38 rigid printed circuit board element
40 inner layer core
42 layer of epoxy resin and glass fabric
44 conductor material
46 photosensitive film
48 photo element
50 exposure element
52 texturing
54 prepreg interlayer
56 element

The invention claimed is:

1. A method for producing a planar coil assembly (32) which has n planar coil units (10) arranged one on top of the other, wherein n is a natural number greater than 1, the method comprising:
- a) creating an i-th planar coil unit (10) by producing, with the aid of a computer, at least one planar coil (12) made of an electric conductor and having a planar coil thickness $d_{i,PS}$ on an insulating material layer (14) made of electric insulating material having a layer thickness $d_{i,IM}$, for i equal to 1 to n, and
- b) arranging the planar coil units (10) in layers, with the interposition of the insulating material layer (14) between the planar coils (12), wherein the thicknesses $d_{i,PS}$ and $d_{i,IM}$, are selected such that $$0,6 \leq \frac{D_{PS}}{D_{IM}+D_{PS}} \leq 0,9,$$

applies, where $D_{PS}=\Sigma_{i=1}^{n} d_{i,PS}$ is the sum of the thicknesses $d_{i,PS}$ of the planar coils and $D_{IM}=\Sigma_{i=1}^{n} d_{i,IM}$ is the sum of the thicknesses of the insulating material layers,
wherein step a) comprises at least one of following steps:
- a1) fabricating several planar coils (12) per planar coil unit (10) lying in one plane by computer-aided production;
- a2) fabricating several planar coils (12) per planar coil unit (10) lying in one plane by symmetrical computer-aided production;
- a3) fabricating the planar coils (12) of different planar coil units (10) symmetrically to each other by computer-aided production;
- a4) symmetrically fabricating the planar coils (12) of a planar coil unit (10) and the planar coils (12) of several planar coil units (10) by computer-aided production;
- a5) lithographically fabricating the at least one planar coil (12) by computer-aided production;
- a6) fabricating, by computer-aided production, the at least one planar coil (12) per planar coil unit (10) on an insulating material layer (14) selected from the group of insulating materials consisting of a printed circuit board base material, a prepreg layer, and a synthetic material;
- a7) fabricating the at least one planar coil (12) to have several coil tracks separated from each other;
- a8) fabricating a central generator planar coil and at least a first, a second, and a third measuring planar coil per planar coil unit in a point-symmetrical arrangement to each other; or
- a9) fabricating a central generator planar coil and at least a first, a second, a third, and a fourth measuring planar coil per planar coil unit in an axially symmetric or point-symmetric arrangement to each other.

2. The method according to claim 1, further comprising:
- c) electrically connecting planar coils (12) of the planar coil units (10) arranged one on top of the other in order to form at least one magnetic coil.

3. The method according to claim 1,
wherein, in step b), only a single insulating material layer (14) having the thickness $d_{i,IM}$ is arranged between each planar coil (12).

4. The method according to claim 1, further comprising:
- d) forming at least one through-opening (26) through a center of superimposed planar coils (12) of the planar coil units (10).

5. The method according to claim 4, further comprising at least one of following steps:
- 6.1 electrically connecting superimposed planar coils (12) by means of at least one through-connection (24) at the at least one through-opening (26);
- 6.2 inserting a flux concentrator into said at least one through-opening (26); or
- 6.3 performing step d) in such a way that the insulating material layers (14) are provided with the respective region of the through-opening (26).

6. A method for producing a sensor head for a torque or force sensor which comprises a generator coil for generating a magnetic field and at least a first and a second measuring coil for measuring a change in a magnetic field induced in a measuring body, the method comprising:
performing the method according to claim 1 for producing the generator coil and the measuring coils.

7. A sensor head, produced by the method according to claim 6.

8. A method for producing a planar coil assembly (32) which has n planar coil units (10) arranged one on top of the other, wherein n is a natural number greater than 1, the method comprising:
- (i) creating an i-th planar coil unit (10) by producing, with the aid of a computer, at least one planar coil (12) made of an electric conductor and having a planar coil thickness $d_{i,PS}$ on an insulating material layer (14) made of electric insulating material having a layer thickness $d_{i,IM}$, for I equal to 1 to n;
- (ii) arranging the planar coil units (10) in layers, with the interposition of the insulating material layer (14) between the planar coils (12), wherein the thicknesses dos and dom, are selected such that $$0,6 \leq \frac{D_{PS}}{D_{IM}+D_{PS}} \leq 0,9,$$

applies, where $$D_{PS} = \sum_{i=1}^{n} d_{i,PS}$$

is the sum of the thicknesses $d_{i,PS}$ of the planar coils and $$D_{IM} = \sum_{i=1}^{n} d_{i,IM}$$

is the sum of the thicknesses of the insulating material layers; and
- (iii) forming at least one through-opening (26) through a center of superimposed planar coils (12) of the planar coil units (10), wherein the method further comprises at least one of following steps:
  - electrically connecting superimposed planar coils (12) by means of at least one through-connection (24) at the at least one through-opening (26);
  - inserting a flux concentrator into said at least one through-opening (26); or
  - performing step (iii) in such a way that the insulating material layers (14) are provided with the respective region of the through-opening (26).

9. The method according to claim 8, further comprising:
electrically connecting planar coils (12) of the planar coil units (10) arranged one on top of the other in order to form at least one magnetic coil.

10. The method according to claim 8,
wherein, in step (ii), only a single insulating material layer (14) having the thickness dom is arranged between each planar coil (12).

11. A method for producing a sensor head for a torque or force sensor which comprises a generator coil for generating a magnetic field and at least a first and a second measuring coil for measuring a change in a magnetic field induced in a measuring body, the method comprising:
performing the method according to claim 8 for producing the generator coil and the measuring coils.

12. A sensor head, produced by the method according to claim 11.

* * * * *